United States Patent
McCarrick

(10) Patent No.: US 10,397,134 B2
(45) Date of Patent: *Aug. 27, 2019

(54) BANDWIDTH SHARING

(71) Applicant: International Business Machines Corporation, Armonk, NY (US)

(72) Inventor: Michael D. McCarrick, Galena, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,537

(22) Filed: Jul. 31, 2018

(65) Prior Publication Data

US 2018/0337869 A1 Nov. 22, 2018

Related U.S. Application Data

(63) Continuation of application No. 15/848,106, filed on Dec. 20, 2017, now Pat. No. 10,122,652, which is a continuation of application No. 14/838,933, filed on Aug. 28, 2015, now Pat. No. 9,923,841.

(51) Int. Cl.
*H04L 12/911* (2013.01)
*G06F 16/00* (2019.01)

(52) U.S. Cl.
CPC .............. *H04L 47/82* (2013.01); *G06F 16/00* (2019.01)

(58) Field of Classification Search
None
See application file for complete search history.

(56) References Cited

U.S. PATENT DOCUMENTS

| 6,947,409 | B2 | 9/2005 | Iwamura | |
| 9,032,077 | B1 * | 5/2015 | Klein | H04L 29/08 370/395.21 |
| 9,923,841 | B2 | 3/2018 | McCarrick | |

(Continued)

OTHER PUBLICATIONS http://en.wikipedia.org/wiki/Bandwidth_management, Jul. 27, 2015.
(Continued)

*Primary Examiner* — Oleg Survillo
*Assistant Examiner* — Christopher P Cadorna
(74) *Attorney, Agent, or Firm* — Schmeiser, Olsen & Watts, LLP; Isaac Gooshaw

(57) ABSTRACT

A method and system for bandwidth sharing to enable communication between users. A second key is received from a first user after the first user received the second key from a second user. A directive to transfer W upload bandwidth from the first user to the second user for a time duration is received. A first and second key was previously provided to the first and second user, configured to identify the first and second user, in conjunction with the first user and second user having an upload bandwidth of U1 and U2 for transmitting data, respectively. Responsive to the second key being received from the first user, the first and second user's upload bandwidth is changed to U2−W and U1+W, respectively. The specified data is transferred from the second user to the first user with a permitted upload bandwidth between U2 and U2+W.

15 Claims, 3 Drawing Sheets

(56) References Cited

U.S. PATENT DOCUMENTS

| | | | |
|---|---|---|---|
| 2004/0064351 A1* | 4/2004 | Mikurak | G06Q 10/087 |
| | | | 705/22 |
| 2014/0122324 A1 | 5/2014 | Spier | |
| 2014/0207677 A1 | 7/2014 | Van Wel et al. | |
| 2015/0113147 A1 | 4/2015 | Martini | |
| 2017/0063721 A1 | 3/2017 | McCarrick | |
| 2018/0115499 A1 | 4/2018 | McCarrick | |

OTHER PUBLICATIONS

Office Action (dated Jun. 12, 2017) for U.S. Appl. No. 14/838,933, filed Aug. 28, 2015.
Amendment (dated Sep. 11, 2017) for U.S. Appl. No. 14/838,933, filed Aug. 28, 2015.
Notice of Allowance (dated Oct. 25, 2017) for U.S. Appl. No. 14/838,933, filed Aug. 28, 2015.
Notice of Allowance (dated Jun. 26, 2018) for U.S. Appl. No. 15/848,106, filed Dec. 20, 2017.

\* cited by examiner

BANDWIDTH SHARING

This application is a continuation application claiming priority to Ser. No. 15/848,106, filed Dec. 20, 2017, which is a continuation of Ser. No. 14/838,933, filed Aug. 28, 2015, U.S. Pat. No. 9,923,841, issued Mar. 20, 2018.

TECHNICAL FIELD

The invention relates to networking software and systems.

BACKGROUND

Insufficient bandwidth exists to perform tasks such as streaming, uploading files, VoIP, and other bandwidth intensive activities. Often times you may visit a friend's or relative's house where they have internet access, but their current data plan they pay for does not provide a sufficient upload or download rate to perform activities such as watching Netflix or transferring large files. There's also the issue of attempting to stream data to someone else (such as voice over internet protocol, twitch, screensharing, etc.), in which a user may not have a sufficient upload or download rate (as limited by their internet service provider's internet plan) to perform these activities.

SUMMARY

In general, examples disclosed herein are directed to techniques for bandwidth sharing. In one aspect, the techniques include providing a first key to a first user, providing a second key to a second user, receiving the second key from the first user and, responsive to receiving the second key from the first user, allocating an amount of bandwidth normally allocated to the first user to the second user.

The allocated amount of bandwidth may be restricted to a set amount. For example, a time out value may be associated with the second key and the allocated amount of bandwidth may be bounded to the time out value. The allocation may also be revoked. In another example, a computer system for bandwidth sharing includes one or more processors, one or more computer-readable memories, and one or more computer-readable, tangible storage devices. The system further include program instructions stored on at least one of the one or more storage devices for execution by at least one of the one or more processors via at least one of the one or more memories, to provide a first key to a first user, provide a second key to a second user, receive the second key from the first user and, responsive to receiving the second key from the first user, allocate an amount of bandwidth normally allocated to the first user to the second user.

In another example, a computer program product includes a computer-readable storage medium has program code embodied therewith. The program code is executable by a computing device to provide a first key to a first user, provide a second key to a second user, receive the second key from the first user and, responsive to receiving the second key from the first user, allocate an amount of bandwidth normally allocated to the first user to the second user.

DETAILED DESCRIPTION

Figure 1:
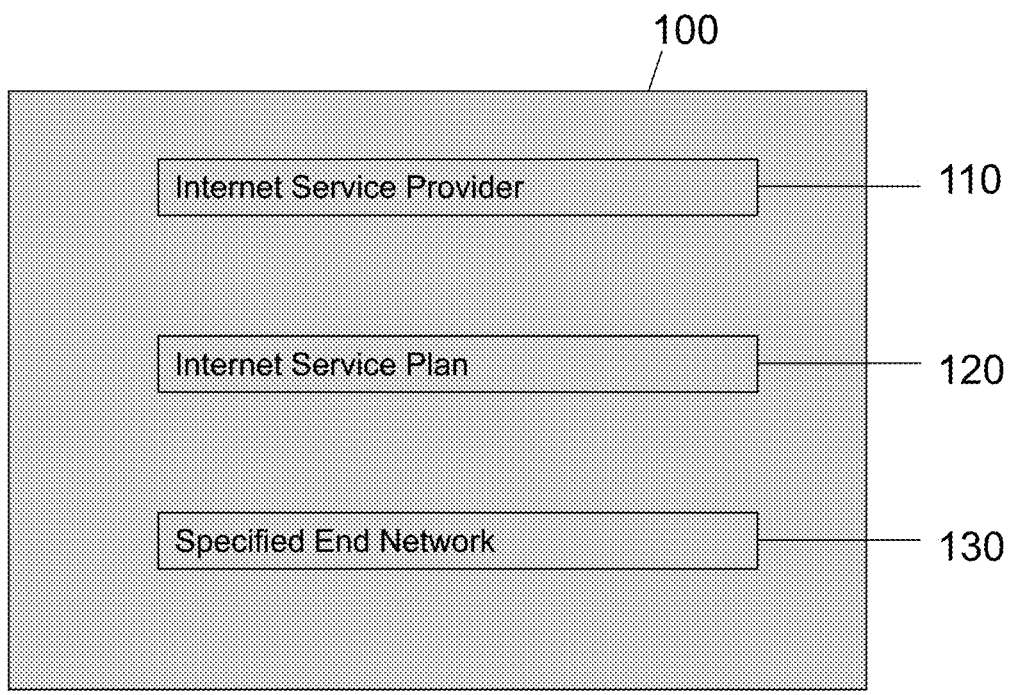
FIG. 1 is a block diagram illustrating a computing environment for bandwidth sharing.

Various examples are disclosed herein for bandwidth sharing. Many forms of bandwidth management exist. However, the issue comes in that you must be in control of whatever device is allocating bandwidth. This is not the case with modern homes in which customers purchase bandwidth allocation from an ISP (internet service provider). Once a customer has a plan, they are tied to a specific bandwidth allocation unless they pay for an upgrade (which in some cases would only take effect at the end of the month), which they may only need temporarily. This setup also can also hinder others working with each other (e.g. streaming, screen sharing, file transfers) as there is not a way to fix your peer's slow internet connection, which may make screen sharing or VoIP unpleasant for other users.

One workaround is illustrated in the following example. Suppose Bob and Alice are friends. They both are internet users and as such have purchased an internet plan from their respective internet provider. Upon purchase the ISP has created a new entry in their database to mark that Bob has data plan X. Similarly, an ISP has an entry in their database to mark that Alice has data plan Y.

Each ISP then gives Bob and Alice their own unique key that they can pass out. The ISP's will be able to parse the key and identify the correct company to communicate with (if necessary).

Bob's key may look something like this:
TWC:bob@bob.com
While Alice's may look something like this
TWC:alice@alice.com Bob and Alice wish to have a skype session. However, Alice does not have the bandwidth requirements for a video call, so Bob is willing to share his bandwidth. Alice first gives Bob her key (TWC:alice@alice.com). Bob then goes to his ISP's control panel. He enters in Alice's key and marks that he wishes to give her some W upload and Z download. Where both W and Z are less than his data plans maximum amount for upload and download rate. He also marks that he only wishes this to last N hours. The control panel then takes care of the rest in terms of submitting his request to give Alice more bandwidth. The control panel possibly makes a REST call to the back-end server that may look like: TWC:bob@bob.com:TWC:alice@alice.com:W/Z:Nh. Upon receiving this request, the ISP REDUCES Bob's upload by W and download by Z. It then INCREASES Alice's upload by W and download by Z. This change will only last for N hours, where W, Z, and N are all numbers.

As illustrated in the above example, in one embodiment, end users in an ISP's database will have some unique key that they are able to give out and share. Some other end user can use this key to temporarily assign a portion of his allocated bandwidth (purchased from an ISP) to another user (and revoke at will). This would allow users to dynamically give and receive boosts to their bandwidth without having to be in control of a router or upgrading someone else's (or their own) internet plan.

In another example case, your friend is trying to stream his desktop (or a game via Twitch.tv), but because of the internet plan he purchased from his ISP, he only has a download rate of 5 Mbps and an upload rate of 0.5 Mbps, which is not sufficient for streaming his desktop to you. You on the other hand, have a download rate of 60 Mbps and an upload rate of 10 Mbps so you would be able to easily stream; however, you are not your friend. If this system were implemented, you would be able to temporarily donate a portion of your upload rate to your friend. For instance, you could donate 8 Mbps of your upload rate to him. This would leave you with 2 Mbps and your friend with 8.5 Mbps, enough for him to stream his desktop to you.

In another example, you, the system user, has the ability to take your purchased data plan with you wherever you went (assuming you had internet access and local hardware that supported it). If you've paid for a 60/5 down/upload plan, but have gone to your mother's house (or to some internet cafe) who only has the 5/0.5 plan, you would struggle watching movies on Netflix. With this you would be able to assign your bandwidth to your mother's home and would be able to use the data plan you purchased to download and watch movies much faster.

In another case scenario involving a large corporation, when a user upload's a video, it may take several minutes to upload a high quality video, and the upload time only gets worse as the videos become longer. In one implementation, the large corporation has the user's key and ISP on file (registered by the user). Then when the large corporation notices they're uploading a file, they could temporarily give them a large upload boost until the file upload is complete, reducing the upload time significantly (this is assuming that the large corporation has spare resources for such things and would be economical to donate a few seconds of their bandwidth to users uploading videos).

FIG. 1 is a block diagram illustrating one embodiment of a system for bandwidth sharing. The system 100 includes an internet service provider 110. The system utilizes the ISP's existing bandwidth management solutions, and makes them more dynamic and controllable by their customers and letting the customer inform the ISP how/where they want their bandwidth allocated. By default an ISP will allocate the customer's purchased internet service plan 120 to a specific end home (or business) network 130.

In one implementation, User 1 makes a request to his ISP 100 to allocate x of his upload or download to user 2. The ISP 100 receives the request and modifies a table in their database specifying how much of the bandwidth should be taken from user 1 and given to user 2. The ISP 100 then uses whatever system they're using for bandwidth management and increases user 2's bandwidth by the specified amount.

User 2 may then be notified (if the ISP's system supports it), and will be able to use their internet service as if they had their original bandwidth allocation in addition to the x amount provided from user 1. User 1 and User 2 may be the same person, but could be different locations. User 1 may then revoke the donated bandwidth at any time by making another request, or setting a timer.

When the bandwidth is revoked, the ISP 100 will undo the changes accordingly and user 2 will be restricted to their original bandwidth allocation once again.

Requests may be made in many different ways including a GUI on an internet page (such as a customer control panel), a text message, a phone call to customer service, or any other messaging service available.

Figure 2:
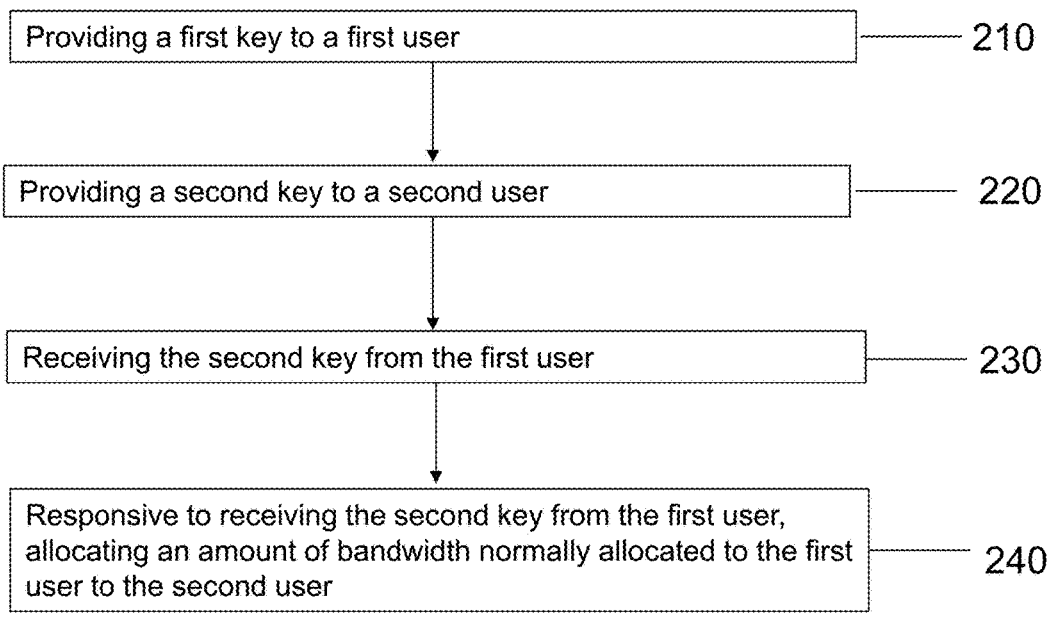
FIG. 2 is a flow diagram illustrating a method for bandwidth sharing.

As shown in FIG. 2, one implementation of a method for dynamic bandwidth sharing includes providing a first key to a first user (210), providing a second key to a second user (220) receiving the second key from the first user (230) and, responsive to receiving the second key from the first user, allocating an amount of bandwidth normally allocated to the first user to the second user (240).

Figure 3:
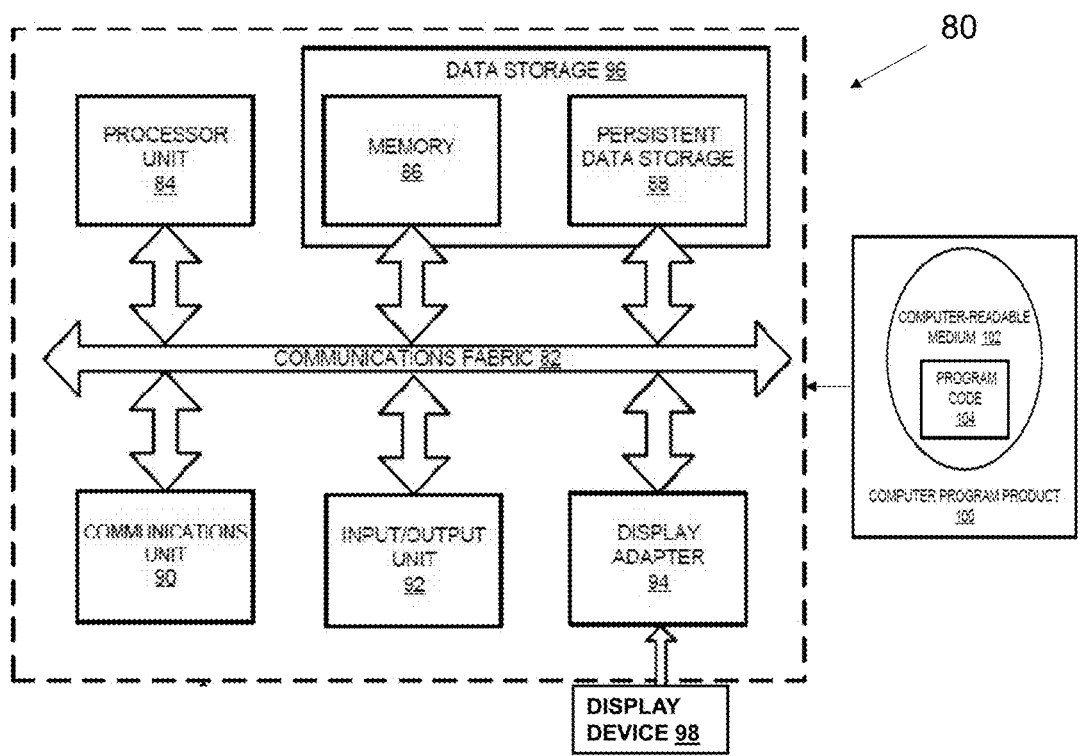
FIG. 3 is a block diagram of a computing device for bandwidth sharing.

The allocated amount of bandwidth may be restricted to a set amount. For example, a time out value may be associated with the second key and the allocated amount of bandwidth may be bounded to the time out value. The allocation may also be revoked. FIG. 3 is a block diagram of a computing device 80 that may be used to execute a bandwidth sharing program, according to an illustrative example. Computing device 80 may be a server such as a web server or application server. Computing device 80 may also be a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations. Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links.

Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples. Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of IBM CONFIDENTIAL D-2 the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for bandwidth sharing to enable communication between users over the Internet, said method comprising:

receiving, by an Internet Service Provider (ISP) from a first user after the first user received a second key from a second user: the second key and a directive to transfer bandwidth from the first user to the second user for a finite time duration N, wherein the bandwidth to be transferred comprises W upload bandwidth, wherein the ISP previously provided a first key to the first user in conjunction with a first plan in which the first user purchased from the ISP an upload bandwidth of U1 for transmitting data via the Internet and a download bandwidth of D1 for receiving data via the Internet, wherein the first key is configured to identify the first user, wherein the ISP previously provided the second key to the second user in conjunction with a second plan in which the second user purchased from the ISP an upload bandwidth of U2 for transmitting data via the Internet and a download bandwidth of D2 for receiving data via the Internet, wherein the second key is configured to identify the second user, and wherein U1, D1, U2 and D2 differ from one another;

responsive to said receiving the second key from the first user, changing bandwidth, by the ISP for the time duration N, wherein said changing bandwidth comprises changing the second user's upload bandwidth to U2+W and changing the first user's upload bandwidth to U1−W, wherein W is an additional upload bandwidth, and wherein communication between the second user and the first user requires a permitted upload bandwidth greater than U2 and less than U2+W, and responsive to receiving, by the ISP from the second user within the time duration N, a directive to establish a communication between the second user and the first user to transfer specified data, transferring, by the ISP during the time duration N in accordance with the permitted upload bandwidth, the specified data from the second user to the first user.

2. The method of claim 1, wherein the bandwidth to be transferred further comprises Z download bandwidth, and wherein said changing bandwidth further comprises changing the second user's download bandwidth to D2+Z and changing first user's download bandwidth to D1−Z.

3. The method of claim 2, wherein W is unequal to Z.

4. The method of claim 1, wherein said receiving the second key from the first user includes receiving a request from the first user through a graphical user interface.

5. The method of claim 1, wherein said receiving the second key from the first user includes receiving a request from the first user through a cellular phone network.

6. A computer program product, comprising one or more computer readable hardware storage devices containing computer readable program code that when executed by one or more processors of a computer system implements a method for bandwidth sharing to enable communication between users over the Internet, said method comprising:

receiving, by an Internet Service Provider (ISP) from a first user after the first user received a second key from a second user: the second key and a directive to transfer bandwidth from the first user to the second user for a finite time duration N, wherein the bandwidth to be transferred comprises W upload bandwidth, wherein the ISP previously provided a first key to the first user in conjunction with a first plan in which the first user purchased from the ISP an upload bandwidth of U1 for transmitting data via the Internet and a download bandwidth of D1 for receiving data via the Internet, wherein the first key is configured to identify the first user, wherein the ISP previously provided the second key to the second user in conjunction with a second plan in which the second user purchased from the ISP an upload bandwidth of U2 for transmitting data via the Internet and a download bandwidth of D2 for receiving data via the Internet, wherein the second key is configured to identify the second user, and wherein U1, D1, U2 and D2 differ from one another;

responsive to said receiving the second key from the first user, changing bandwidth, by the ISP for the time duration N, wherein said changing bandwidth comprises changing the second user's upload bandwidth to U2+W and changing the first user's upload bandwidth to U1−W, wherein W is an additional upload bandwidth, and wherein communication between the second user and the first user requires a permitted upload bandwidth greater than U2 and less than U2+W; and responsive to receiving, by the ISP from the second user within the time duration N, a directive to establish a communication between the second user and the first user to transfer specified data, transferring, by the ISP during the time duration N in accordance with the permitted upload bandwidth, the specified data from the second user to the first user.

7. The computer program product of claim 6, wherein the bandwidth to be transferred further comprises Z download bandwidth, and wherein said changing bandwidth further comprises changing the second user's download bandwidth to D2+Z and changing first user's download bandwidth to D1−Z.

8. The computer program product of claim 7, wherein W is unequal to Z.

9. The computer program product of claim 6, wherein said receiving the second key from the first user includes receiving a request from the first user through a graphical user interface.

10. The computer program product of claim 6, wherein said receiving the second key from the first user includes receiving a request from the first user through a cellular phone network.

11. A computer system, comprising: one or more processors; one or more memories; and one or more computer readable hardware storage devices containing computer readable program code that when executed by the one or more processors via the one or more memories implements a method for bandwidth sharing to enable communication between users over the Internet, said method comprising:

receiving, by an Internet Service Provider (ISP) from a first user after the first user received a second key from a second user: the second key and a directive to transfer bandwidth from the first user to the second user for a finite time duration N, wherein the bandwidth to be transferred comprises W upload bandwidth, wherein the ISP previously provided a first key to the first user in conjunction with a first plan in which the first user purchased from the ISP an upload bandwidth of U1 for transmitting data via the Internet and a download bandwidth of D1 for receiving data via the Internet, wherein the first key is configured to identify the first user, wherein the ISP previously provided the second key to the second user in conjunction with a second plan in which the second user purchased from the ISP an upload bandwidth of U2 for transmitting data via the Internet and a download bandwidth of D2 for receiving data via the Internet, wherein the second key is configured to identify the second user, and wherein U1, D1, U2 and D2 differ from one another;

responsive to said receiving the second key from the first user, changing bandwidth, by the ISP for the time duration N, wherein said changing bandwidth comprises changing the second user's upload bandwidth to U2+W and changing the first user's upload bandwidth to U1−W, wherein W is an additional upload bandwidth, and wherein communication between the second user and the first user requires a permitted upload bandwidth greater than U2 and less than U2+W; and responsive to receiving, by the ISP from the second user within the time duration N, a directive to establish a communication between the second user and the first user to transfer specified data, transferring, by the ISP during the time duration N in accordance with the permitted upload bandwidth, the specified data from the second user to the first user.

12. The computer system of claim 11, wherein the bandwidth to be transferred further comprises Z download bandwidth, and wherein said changing bandwidth further comprises changing the second user's download bandwidth to D2+Z and changing first user's download bandwidth to D1−Z.

13. The computer system of claim 12, wherein W is unequal to Z.

14. The computer system of claim 11, wherein said receiving the second key from the first user includes receiving a request from the first user through a graphical user interface.

15. The computer system of claim 11, wherein said receiving the second key from the first user includes receiving a request from the first user through a cellular phone network.

* * * * *